(12) United States Patent
Shatsky

(10) Patent No.: US 11,194,664 B2
(45) Date of Patent: *Dec. 7, 2021

(54) STORAGE SYSTEM CONFIGURED TO GUARANTEE SUFFICIENT CAPACITY FOR A DISTRIBUTED RAID REBUILD PROCESS

(71) Applicant: EMC IP Holding Company LLC, Hopkinton, MA (US)

(72) Inventor: Yosef Shatsky, Karnei Shomron (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/852,632

(22) Filed: Apr. 20, 2020

(65) Prior Publication Data

US 2021/0326206 A1 Oct. 21, 2021

(51) Int. Cl.
*G06F 11/10* (2006.01)
*G06F 11/30* (2006.01)
(Continued)

(52) U.S. Cl.
CPC ........ *G06F 11/1092* (2013.01); *G06F 3/0689* (2013.01); *G06F 11/0772* (2013.01); *G06F 11/1088* (2013.01); *G06F 11/3034* (2013.01)

(58) Field of Classification Search
CPC ............. G06F 11/1092; G06F 11/1088; G06F 11/0772; G06F 11/0766; G06F 11/0751;
(Continued)

(56) References Cited

U.S. PATENT DOCUMENTS 7,165,155 B1 1/2007 Duprey et al.
7,440,982 B2 10/2008 Lu et al.
(Continued)

FOREIGN PATENT DOCUMENTS

WO 2016111954 A1 7/2016
WO PCT/US2019/024885 1/2020
WO PCT/US2019/024900 1/2020

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Yolanda L Wilson
(74) *Attorney, Agent, or Firm* — Ryan, Mason & Lewis, LLP

(57) ABSTRACT

A storage system comprises a plurality of storage devices, and is configured to establish a redundant array of independent disks (RAID) arrangement comprising a plurality of stripes, with each of the plurality of stripes comprising a plurality of blocks, the blocks being distributed across multiple ones of the storage devices. In conjunction with establishment of the RAID arrangement, the storage system is further configured, for each of the plurality of stripes, to designate a particular one of the storage devices as a spare storage device for that stripe, and for each of the storage devices, to determine numbers of the stripes for which that storage device is designated as a spare device for respective ones of the other storage devices. A particular number of spare blocks is reserved for each of the storage devices based at least in part on its determined numbers of the stripes.

20 Claims, 8 Drawing Sheets

(51) Int. Cl.
 *G06F 11/07* (2006.01)
 *G06F 3/06* (2006.01)
(58) Field of Classification Search
 CPC ... G06F 11/3034; G06F 3/0689; G06F 3/0619
 See application file for complete search history.

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0084600 | A1* | 4/2012 | Kidney ............... G06F 11/1088 714/6.13 |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0129795 | A1* | 5/2019 | Xu ....................... G06F 11/2094 |
| 2019/0129815 | A1* | 5/2019 | Gao .................... G06F 11/0727 |
| 2019/0303490 | A1 | 10/2019 | Chen et al. |
| 2019/0347150 | A1* | 11/2019 | Bradshaw ........... G06F 11/0793 |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0341845 | A1* | 10/2020 | Gao .................... G06F 11/2069 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. filed Jul. 28, 2017, and entitled "Token-Based Data Flow Control in a Clustered Storage System."

U.S. Appl. No. 15/793,121 filed in the name of David Meiri et al. filed Oct. 25, 2017, and entitled "Opportunistic Compression of Replicated Data in a Content Addressable Storage System."

U.S. Appl. No. 15/824,536 filed in the name of Christopher Sayles et al. filed Nov. 28, 2017, and entitled "Storage System with Asynchronous Messaging between Processing Modules for Data Replication."

U.S. Appl. No. 16/253,793 filed in the name of Yuval Harduf et al. filed Jan. 22, 2019, and entitled "Storage System with Data Consistency Checking in Synchronous Replication Using Active Snapshot Set."

U.S. Appl. No. 16/265,131 filed in the name of Lior Kamran et al. filed Feb. 1, 2019, and entitled "Storage System with Write Cache Release Protection."

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. filed Apr. 29, 2019, and entitled "Storage System with Deduplication-Aware Replication Implemented Using a Standard Storage Command Protocol."

U.S. Appl. No. 16/413,050 filed in the name of Xiangping Chen et al. filed May 15, 2019, and entitled "Storage System with Coordinated Recovery across Multiple Input-Output Journals of Different Types."

U.S. Appl. No. 16/663,524 filed in the name of Xiangping Chen et al. filed Oct. 25, 2019, and entitled "Storage System with Throughput-Based Timing of Synchronous Replication Recovery."

U.S. Appl. No. 16/665,651 filed in the name of Lior Kamran et al. filed Oct. 28, 2019, and entitled "Recovery Flow with Reduced Address Lock Contention in a Content Addressable Storage System."

(56) References Cited

OTHER PUBLICATIONS

U.S. Appl. No. 16/166,397 filed in the name of Nimrod Shani et al. filed Oct. 22, 2018, and entitled "Storage System with Data Integrity Verification Performed in Conjunction with Internal Data Movement."

U.S. Appl. No. 16/530,121 filed in the name of Anton Kucherov et al. filed Aug. 2, 2019, and entitled "Memory-Efficient Processing of Raid Metadata Bitmaps."

U.S. Appl. No. 16/671,824 filed in the name of Lior Kamran et al. filed Nov. 1, 2019, and entitled "Storage System Capacity Expansion Using Mixed-Capacity Storage Devices."

U.S. Appl. No. 16/693,858 filed in the name of Doron Tai filed Nov. 25, 2019, and entitled "Storage System with Prioritized RAID Rebuild."

U.S. Appl. No. 16/693,858 filed in the name of Yosef Shatsky et al. filed Feb. 18, 2020, and entitled "Storage System with Efficient Data and Parity Distribution Across Mixed-Capacity Storage Devices."

\* cited by examiner

| # | D1 | D2 | D3 | D4 | D5 |
|---|----|----|----|----|----|
| 1 | 1 |  | 1 | 1 | 1 |
| 2 | x | 1 |  | 1 | 1 |
| 3 | 1 | 1 | 1 | x |  |
| 4 | 1 | 1 | 1 | 1 |  |
| 5 |  | 1 | 1 |  | x |
| 6 | 1 | 1 | 1 |  | 1 |
| 7 | x | 1 | 1 |  | 1 |
| 8 | 1 | 1 | x | 1 | 1 |
| 9 |  | 1 | 1 | 1 | x |
| 10 | 1 | 1 | 1 | 1 |  |
| 11 | 1 | 1 | 1 | 1 | 1 |
| 12 | 1 |  | 1 | 1 |  |
| 13 | 1 | 1 | 1 | 1 | 1 |
| Σ | 8 | 8 | 8 | 8 | 7 |

FIG. 3B

| # | D1 | D2 | D3 | D4 | D5 |
|---|----|----|----|----|----|
| 1 | 1 |  | 1 | 1 | 1 |
| 2 |  | 1 |  | 1 | 1 |
| 3 | 1 | 1 | 1 | 1 |  |
| 4 | 1 | 1 | 1 | 1 |  |
| 5 |  | 1 | 1 |  | 1 |
| 6 | 1 | 1 | 1 |  | 1 |
| 7 |  | 1 | 1 |  | 1 |
| 8 | 1 | 1 |  | 1 | 1 |
| 9 |  | 1 | 1 | 1 |  |
| 10 | 1 | 1 | 1 | 1 |  |
| 11 | 1 | 1 | 1 | 1 | 1 |
| 12 | 1 |  | 1 | 1 |  |
| 13 | 1 | 1 | 1 | 1 | 1 |
| Σ | 8 | 8 | 8 | 8 | 7 |

FIG. 3A

| # | D1 | D2 | D3 | D4 | D5 | Spare |
|---|----|----|----|----|----|-------|
| 1 |    |    |    | 1  |    | D5 |
| 2 | 1  | 1  |    | 1  | 1  | D1 |
| 3 |    |    | 1  |    |    | D4 |
| 4 | 1  | 1  |    | 1  | 1  | D2 |
| 5 |    |    |    |    |    | D1 |
| 6 | 1  | 1  | 1  | 1  | 1  | D2 |
| 7 | 1  | 1  | 1  |    | 1  | D3 |
| 8 |    | 1  | 1  |    | 1  | D4 |
| 9 |    | 1  | 1  | 1  |    | D5 |
| 10|    | 1  |    | 1  | 1  | D3 |
| 11| 1  |    | 1  | 1  |    | D3 |
| 12| 1  |    |    | 1  | 1  | D5 |
| 13| 1  |    | 1  | 1  | 1  | D2 |
| Σ | 8  | 8  | 8  | 8  | 7  |    |

FIG. 4

| Source | | | | | | Spare | |
|---|---|---|---|---|---|---|---|
| D1 | D2 | D3 | D4 | D5 | | Device | Blocks |
| 0 | 2 | 1 | 2 | 1 | | D1 | 2 |
| 3 | 0 | 2 | 1 | 3 | | D2 | 3 |
| 2 | 3 | 0 | 2 | 2 | | D3 | 3 |
| 1 | 2 | 2 | 0 | 1 | | D4 | 2 |
| 2 | 1 | 3 | 3 | 0 | | D5 | 3 |

FIG. 5

| # | D1 | D2 | D3 | D4 | D5 | Spare |
|---|----|----|----|----|----|-------|
| 1 | 1 |   | 1 | 1 | 1 | D5 |
| 2 | × | 1 | 1 | 1 | 1 | D1 |
| 3 | 1 | 1 | 1 | × | 1 | D4 |
| 4 | 1 | 1 | 1 | 1 | 1 | D2 |
| 5 | × | 1 | 1 | 1 | 1 | D1 |
| 6 | 1 | 1 | 1 | 1 | 1 | D2 |
| 7 | 1 | 1 | × | 1 | 1 | D3 |
| 8 | 1 | 1 | 1 | × | 1 | D4 |
| 9 |   | 1 | 1 | 1 | × | D5 |
| 10 | 1 | 1 | × | 1 | 1 | D3 |
| 11 | 1 | 1 | × | 1 | 1 | D3 |
| 12 | 1 | 1 | 1 | 1 | 1 | D5 |
| 13 | 1 | 1 | 1 | 1 | 1 | D2 |
| Σ | 8 | 8 | 8 | 8 | 7 |   |

FIG. 6

STORAGE SYSTEM CONFIGURED TO GUARANTEE SUFFICIENT CAPACITY FOR A DISTRIBUTED RAID REBUILD PROCESS

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt using parity information, typically in response to a storage device failure or other type of failure within the storage system. For example, a RAID 6 arrangement uses "dual parity" and can recover from simultaneous failure of two storage devices of the storage system. These and other RAID arrangements provide redundancy for stored data, with different types of RAID arrangements providing different levels of redundancy. Storage systems that utilize such RAID arrangements are typically configured to perform a rebuild process after detection of a storage device failure, and once the rebuild process is completed, the storage system can sustain additional failures. Conventional RAID techniques of this type can be problematic in certain situations.

For example, in distributed RAID arrangements, in which the total number of blocks per stripe is less than the total number of storage devices across which the blocks are distributed, it is unduly difficult under conventional practice to ensure that there is sufficient available capacity to rebuild the blocks of one or more failed storage devices. Conventional approaches typically require the performance of complex calculations in order to determine a particular allocation of spare capacity across the multiple storage devices, or instead allocate excessive amounts of spare capacity to each device, which wastes storage device capacity and therefore degrades storage system performance.

A need therefore exists for an improved approach that can guarantee sufficient rebuild capacity without the need for complex calculations or wasted capacity, and yet is readily applicable to a wide variety of different RAID arrangements.

SUMMARY

Illustrative embodiments provide techniques for guaranteeing sufficient capacity for a distributed RAID rebuild process in a storage system. For example, some embodiments provide RAID arrangements in which spare blocks are reserved for storage devices in a manner that ensures that a rebuild process initiated responsive to a failure of one or more of the storage devices is guaranteed to have sufficient available storage device capacity to complete the rebuilding of the blocks of the one or more failed storage devices. Reserved capacity in some embodiments is shared at the storage device level, such that, for example, spare blocks reserved on one storage device can be used to rebuild blocks of different ones of the other storage devices in the event that one of those other storage devices were to fail.

Advantageously, such techniques in illustrative embodiments herein can guarantee sufficient capacity to complete the rebuild process, while also being computationally simple, as well as highly efficient in that only at or near minimum amounts of capacity need to be reserved for rebuild within the storage system.

Moreover, the disclosed techniques in illustrative embodiments overcome additional drawbacks of conventional approaches. For example, some embodiments can be used for any type of RAID arrangement, including those involving combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Illustrative embodiments disclosed herein provide efficient mechanisms to guarantee sufficient capacity in these and other situations in which allocation of blocks to stripes cannot be predetermined, and in numerous other demanding RAID arrangements, including those involving parity RAID techniques and/or non-parity RAID techniques.

In one embodiment, a storage system comprises a plurality of storage devices. The storage system is further configured to establish a RAID arrangement comprising a plurality of stripes, with each of the plurality of stripes comprising a plurality of blocks, the blocks being distributed across multiple ones of the storage devices. In conjunction with establishment of the RAID arrangement, the storage system is further configured, for each of the plurality of stripes, to designate a particular one of the storage devices as a spare storage device for that stripe, and for each of the storage devices, to determine numbers of the stripes for which that storage device is designated as a spare device for respective ones of the other storage devices. The storage system is further configured to reserve a particular number of spare blocks for each of the storage devices based at least in part on the determined numbers of the stripes for which that storage device is designated as a spare device for respective ones of the other storage devices.

In some embodiments, the RAID arrangement comprises a distributed RAID arrangement in which a total number of blocks per stripe is less than a total number of the storage devices over which the blocks of the plurality of stripes are distributed.

For example, the RAID arrangement can comprise at least one parity RAID arrangement supporting recovery from a failure of at least one of the plurality of storage devices, such as a RAID 5 arrangement supporting recovery from a failure of a single one of the plurality of storage devices, or a RAID 6 arrangement supporting recovery from simultaneous failure of up to two of the storage devices. In these and other parity RAID arrangements, each of the stripes illustratively comprises a plurality of data blocks and one or more parity blocks. Various combinations of parity RAID and/or non-parity RAID can also be used.

The storage system is illustratively configured to store stripe metadata indicating for each of the stripes the particular one of the storage devices that is designated as a spare storage device for that stripe. For example, the stripe metadata indicating for each of the stripes the particular one of the storage devices that is designated as a spare storage device for that stripe illustratively comprises an allocation table, the allocation table comprising a plurality of entries for respective ones of the stripes with each such entry comprising an identifier of the storage device that is designated as a spare storage device for that stripe.

Additionally or alternatively, the storage system is illustratively configured to store stripe metadata indicating for each of the storage devices the determined numbers of the stripes for which that storage device is designated as a spare device for respective ones of the other storage devices. For example, the stripe metadata indicating for each of the storage devices the determined numbers of the stripes for which that storage device is designated as a spare device for respective ones of the other storage devices illustratively comprises a reserve table, the reserve table comprising a plurality of entries for respective ones of the storage devices with each such entry comprising the determined numbers of the stripes for which that storage device is designated as a spare device for respective ones of the other storage devices.

Numerous other types and arrangements of one or more tables or other stripe metadata can be used in other embodiments.

In some embodiments, reserving a particular number of spare blocks for each of the storage devices based at least in part on the determined numbers of the stripes for which that storage device is designated as a spare device for respective ones of the other storage devices comprises reserving a particular number of spare blocks that is equivalent to a highest one of the determined numbers of the stripes. Other techniques can be used in other embodiments to determine the particular number of spare blocks for a given storage device based at least in part on the determined numbers of the stripes for which that storage device is designated as a spare device for respective ones of the other storage devices.

In some embodiments, the storage system is further configured to detect a failure of at least one of the storage devices, and responsive to the detected failure, to initiate a rebuild process to reconstruct blocks of the one or more failed storage devices utilizing the blocks of other ones of the storage devices. The rebuild process illustratively utilizes at least a subset of the reserved spare blocks of respective ones of the non-failed storage devices.

The reserved spare blocks in illustrative embodiments are sufficient in number to guarantee that a rebuild process initiated responsive to a failure of one or more of the storage devices has sufficient available storage device capacity to reconstruct the blocks of the one or more failed storage devices.

In some embodiments, the reserved spare blocks of a given one of the storage devices are available for utilization in reconstructing one of at least first and second other ones of the storage devices in a rebuild process initiated responsive to a failure of said one of the at least first and second other ones of the storage devices.

Additionally or alternatively, each of the storage devices is designated as a spare device for multiple other ones of the storage devices.

The storage system in some embodiments is implemented as a distributed storage system comprising a plurality of storage nodes, each storing data in accordance with a designated RAID arrangement, although it is to be appreciated that a wide variety of other types of storage systems can be used in other embodiments.

These and other illustrative embodiments include, without limitation, apparatus, systems, methods and processor-readable storage media.

BRIEF DESCRIPTION OF THE DRAWINGS

FIGS. 3A and 3B show an example of potential insufficient capacity for distributed RAID rebuild in an illustrative embodiment. These two figures are also collectively referred to herein as FIG. 3.

FIG. 4 shows an example of stripe metadata comprising an allocation table in which a spare device is allocated to each of a plurality of RAID stripes in an illustrative embodiment.

FIG. 5 shows an example of stripe metadata comprising a reserve table in which numbers of spare blocks are reserved for respective storage devices such that sufficient capacity is guaranteed for distributed RAID rebuild in an illustrative embodiment.

FIG. 6 shows an example of utilization of reserved spare blocks with guaranteed sufficient capacity for distributed RAID rebuild in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
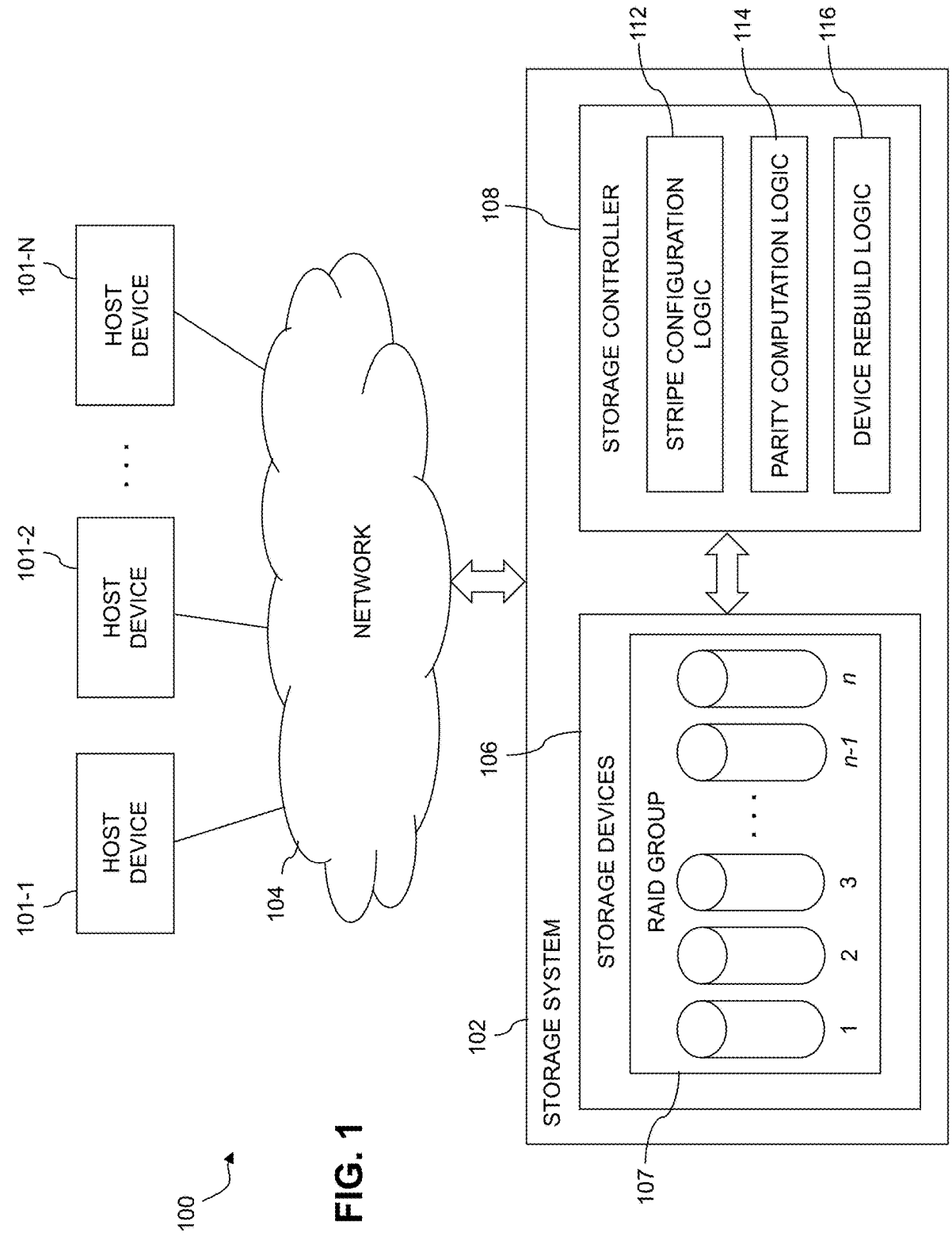
FIG. 1 is a block diagram of an information processing system comprising a storage system configured to guarantee sufficient capacity for distributed RAID rebuild in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with one or more users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of one or more logical storage volumes of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 configured to store data of a plurality of storage volumes. The storage volumes illustratively comprise respective logical units (LUNs) or other types of logical storage volumes. The term "storage volume" as used herein is intended to be broadly construed, and should not be viewed as being limited to any particular format or configuration.

References to "disks" in this embodiment and others disclosed herein are intended to be broadly construed, and are not limited to hard disk drives (HDDs) or other rotational media. For example, at least portions of the storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, HDDs can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell EMC. Other types of MPIO drivers from other driver vendors may be used.

The storage system 102 in this embodiment stores data across the storage devices 106 in accordance with at least one RAID arrangement 107 involving multiple ones of the storage devices 106. The RAID arrangement 107 in the present embodiment illustratively comprises at least one RAID group. The RAID group illustratively comprises storage devices that each have the same capacity. Alternatively, the RAID group may comprise mixed-capacity storage devices, such as one or more storage devices having relatively low capacities and one or more storage devices having relatively high capacities. Such a RAID group is also referred to herein as a mixed-capacity RAID group. There may be multiple distinct RAID groups within the storage system 102, each involving a different subset of the storage devices 106. The term "RAID group" as used herein is intended to be broadly construed, so as to encompass, for example, a set of storage devices that are part of a given RAID arrangement, such as at least a subset of the storage devices 106 that are part of the RAID arrangement 107. A given such RAID group comprises a plurality of stripes, each containing multiple stripe portions distributed over multiple ones of the storage devices 106 that are part of the RAID group.

In the particular illustrative RAID arrangement 107 shown in the figure, the example RAID group more specifically comprises a subset of the storage devices 106 that includes n of the storage devices 106 individually denoted 1 through n, respectively, with each such storage device being assumed for simplicity of illustration to have the same storage capacity. For example, the storage devices 1 through n may comprise respective SSDs each having a 500 Giga-Byte (GB) capacity, a 1 TeraByte (TB) capacity, or another capacity, although these and other particular storage device capacities referred to herein should not be viewed as limiting in any way. It is to be appreciated, however, that the disclosed techniques can be readily extended to other types of RAID groups, such as mixed-capacity RAID groups, each including a variety of different SSDs having different capacities. Illustrative embodiments can therefore include more than two sets of storage devices, such as three, four or more different sets of storage devices, with the storage devices of a given such set each having a storage capacity that is different than that of the storage devices of the other sets. One or more of such sets can alternatively include only a single storage device rather than multiple storage devices.

The RAID arrangement 107 can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. As will be described in more detail below, illustrative embodiments disclosed herein provide efficient mechanisms to guarantee sufficient capacity in these and other situations in which allocation of blocks to stripes cannot be predetermined, and in numerous other demanding RAID arrangements, including those involving parity RAID techniques and/or non-parity RAID techniques.

The RAID arrangement 107 is established by a storage controller 108 of the storage system 102. The storage devices 106 in the context of the RAID arrangement 107 and other RAID arrangements herein are also referred to as "disks" or "drives." A given such RAID arrangement may also be referred to in some embodiments herein as a "RAID array."

The RAID arrangement 107 in this embodiment illustratively includes an array of n different "disks" denoted 1 through n, each a different physical storage device of the storage devices 106. Multiple such physical storage devices are typically utilized to store data of a given LUN or other logical storage volume in the storage system 102. For example, data pages or other data blocks of a given LUN or other logical storage volume can be "striped" along with its corresponding parity information across multiple ones of the disks in the RAID arrangement 107 in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments.

As mentioned previously, conventional RAID techniques of this type can be problematic. For example, in distributed RAID arrangements, in which the total number of blocks per stripe is less than the total number of storage devices across which the blocks are distributed, it is unduly difficult under conventional practice to ensure that there is sufficient available capacity to rebuild the blocks of one or more failed storage devices.

Conventional approaches typically require the performance of complex calculations in order to determine a particular allocation of spare capacity across the multiple storage devices, or instead allocate excessive amounts of spare capacity to each device, which wastes storage device capacity and therefore degrades storage system performance.

The storage system 102 overcomes these and other drawbacks of conventional practice by implementing techniques for guaranteeing sufficient capacity for a distributed RAID rebuild process. For example, as will be described in more detail below, the storage system 102 is configured to guarantee sufficient rebuild capacity, without the need for complex calculations or wasted capacity, for a wide variety of different RAID arrangements. Such embodiments provide RAID arrangements in which spare blocks are reserved for storage devices in a manner that ensures that a rebuild process initiated responsive to a failure of one or more of the storage devices is guaranteed to have sufficient available storage device capacity to complete the rebuilding of the blocks of the one or more failed storage devices. Reserved capacity in some embodiments is shared at the storage device level, such that, for example, spare blocks reserved on one storage device can be used to rebuild blocks of different ones of the other storage devices in the event that one of those other storage devices were to fail.

Advantageously, such techniques in illustrative embodiments herein can guarantee sufficient capacity to complete the rebuild process, while also being computationally simple, as well as highly efficient in that only at or near minimum amounts of capacity need to be reserved for rebuild within the storage system.

The storage controller 108 of storage system 102 comprises stripe configuration logic 112, parity computation logic 114, and device rebuild logic 116. The stripe configuration logic 112 determines an appropriate stripe configuration and a distribution of stripe portions across the storage devices 106 for a given RAID arrangement, including allocation of spare devices for each stripe and reservation of spare blocks for each device in conjunction with guaranteeing sufficient rebuild capacity. The parity computation logic 114 performs parity computations of various RAID arrangements, such as p parity computations of RAID 5, and/or p and q parity computations of RAID 6, using well-known techniques. The device rebuild logic 116 is configured to control the performance of a RAID rebuild process in the storage system 102, as will be described in more detail elsewhere herein.

As noted above, the storage system 102 in this embodiment implements functionality for guaranteeing sufficient capacity for RAID rebuild. This illustratively includes the performance of a process for guaranteeing sufficient capacity for RAID rebuild in the storage system 102, such as the example process to be described below in conjunction with FIG. 2.

References herein to "guaranteeing sufficient capacity for RAID rebuild" are intended to be broadly construed, so as to encompass various types of RAID arrangements in which spare blocks are reserved for particular storage devices 106 in accordance with establishment of the RAID arrangement in the storage system 102.

In operation, the storage controller 108 via its stripe configuration logic 112 establishes a RAID arrangement comprising a plurality of stripes each having multiple portions distributed across multiple ones of the storage devices 106. Examples include the RAID arrangement 107, and the additional RAID arrangements to be described below in conjunction with FIGS. 3 through 6. As mentioned previously, a given RAID 5 or RAID 6 arrangement provides redundancy that supports recovery from failure of a single one of the storage devices 106, or simultaneous failure of two of the storage devices 106, respectively. Other types of RAID arrangements can be used in other embodiments, including other RAID arrangements each supporting at least one recovery option for reconstructing data blocks of at least one of the storage devices 106 responsive to a failure of that storage device.

The stripe portions of each of the stripes illustratively comprise a plurality of data blocks and one or more corresponding parity blocks. The data and parity blocks are also referred to herein as "chunklets" of a RAID stripe, and such blocks or chunklets are examples of what are more generally referred to herein as "stripe portions." In the case of RAID 5, the parity blocks or parity chunklets illustratively comprise row parity or p parity blocks, and are generated by parity computation logic 114 using well-known RAID 5 techniques. In the case of RAID 6, the parity blocks or parity chunklets illustratively comprise row parity or p parity blocks and diagonal parity or q parity blocks, and are generated by parity computation logic 114 using well-known RAID 6 techniques.

The storage controller 108 utilizes its stripe configuration logic 112 to establish a RAID arrangement comprising a plurality of stripes, with each of the plurality of stripes comprising a plurality of data blocks and one or more corresponding parity blocks, the data blocks and parity blocks being distributed across multiple ones of the storage devices 106 of a RAID group. It is to be appreciated, however, that non-parity RAID arrangements, or combinations of non-parity and parity RAID arrangements, can also be used.

Accordingly, in certain portions of the following description of illustrative embodiments, the term "blocks" will be used to refer generally to both data blocks and parity blocks. A RAID arrangement can therefore more generally comprise a plurality of stripes, with each of the plurality of stripes comprising a plurality of blocks, and the blocks being distributed across multiple ones of the storage devices.

In conjunction with establishment of the RAID arrangement, the storage controller 108 is further configured, for each of the plurality of stripes, to designate a particular one of the storage devices as a spare storage device for that stripe, and for each of the storage devices, to determine numbers of the stripes for which that storage device is designated as a spare device for respective ones of the other storage devices. The storage controller 108 reserves a particular number of spare blocks for each of the storage devices based at least in part on the determined numbers of the stripes for which that storage device is designated as a spare device for respective ones of the other storage devices.

The RAID arrangement in some embodiments comprises a distributed RAID arrangement in which a total number of blocks per stripe is less than a total number of the storage devices over which the blocks of the plurality of stripes are distributed. Distributed RAID generally refers to a type of RAID in which the width of the RAID stripe in blocks is smaller than the total number of storage devices over which the blocks are distributed. An important advantage of distributed RAID relative to other types of RAID is a shorter rebuild time. For example, in distributed RAID, spare blocks are illustratively distributed over all of the storage devices that store blocks of the RAID stripes, which reduces rebuild time as the writes performed in conjunction with rebuild are spread over all of those storage devices. Such distributed RAID arrangements can include parity RAID arrangements, non-parity RAID arrangements, or possibly combinations of multiple different RAID types.

In some embodiments, the storage system 102 is further configured to store stripe metadata indicating for each of the stripes the particular one of the storage devices that is designated as a spare storage device for that stripe. For example, the stripe metadata indicating for each of the stripes the particular one of the storage devices that is designated as a spare storage device for that stripe illustratively comprises an allocation table, with the allocation table comprising a plurality of entries for respective ones of the stripes with each such entry comprising an identifier of the storage device that is designated as a spare storage device for that stripe. An example of an allocation table is shown in FIG. 4, although a wide variety of other types of tables or other metadata structures can be used.

Additionally or alternatively, the storage system 102 is further configured to store stripe metadata indicating for each of the storage devices the determined numbers of the stripes for which that storage device is designated as a spare device for respective ones of the other storage devices. For example, the stripe metadata indicating for each of the storage devices the determined numbers of the stripes for which that storage device is designated as a spare device for respective ones of the other storage devices comprises a reserve table, with the reserve table comprising a plurality of entries for respective ones of the storage devices with each such entry comprising the determined numbers of the stripes for which that storage device is designated as a spare device for respective ones of the other storage devices. An example of a reserve table is shown in FIG. 5, although again a wide variety of other types of tables or other metadata structures can be used. For example, a single table or other type of single metadata structure can be configured to store the collective allocation and reserve information of the respective allocation and reserve tables of FIGS. 4 and 5.

In some embodiments, reserving a particular number of spare blocks for each of the storage devices based at least in part on the determined numbers of the stripes for which that storage device is designated as a spare device for respective ones of the other storage devices comprises reserving a particular number of spare blocks that is equivalent to a highest one of the determined numbers of the stripes. In such an arrangement, the number of spare blocks reserved for a given one of the storage devices is the maximum number of the determined numbers of stripes for which that storage device is designated as a spare device for respective ones of the other storage devices. Alternative techniques can be used to reserve particular numbers of spare blocks for respective storage devices based at least in part on their respective sets of determined numbers in other embodiments.

The storage system 102 is illustratively further configured to detect a failure of at least one of the storage devices, and responsive to the detected failure, to initiate a rebuild process to reconstruct blocks of the one or more failed storage devices utilizing the blocks of other ones of the storage devices. The rebuild process utilizes at least a subset of the reserved spare blocks of respective ones of the non-failed storage devices. The reserved spare blocks are sufficient in number to guarantee that a rebuild process initiated responsive to a failure of one or more of the storage devices has sufficient available storage device capacity to reconstruct the blocks of the one or more failed storage devices.

In some embodiments, the reserved spare blocks of a given one of the storage devices are available for utilization in reconstructing one of at least first and second other ones of the storage devices in a rebuild process initiated responsive to a failure of said one of the at least first and second other ones of the storage devices. Each of the storage devices is designated as a spare device for multiple other ones of the storage devices.

In the case of parity RAID arrangements, the storage controller 108 detects a failure of at least one of the storage devices of the RAID arrangement, and responsive to the detected failure, reconstructs data blocks of that storage device utilizing the data blocks and parity blocks stored on other ones of the storage devices, with the reconstructed data blocks being stored in respective ones of the available spare blocks.

This reconstruction also utilizes what is more generally referred to herein as a "rebuild process" to reconstruct the data blocks of the failed storage device based on data blocks and parity blocks of the remaining storage devices of the RAID arrangement. The failure illustratively comprises a full or partial failure of one or more of the storage devices 106 in a RAID group of the RAID arrangement 107. A "remaining storage device" as that term is broadly used herein refers to a storage device that is not currently experiencing a failure. Thus, all of the storage devices of the RAID group other than the one or more storage devices for which a failure was detected are considered remaining storage devices of the RAID group. Such remaining storage devices are also referred to herein as "surviving storage devices," as these storage devices have survived the one or more detected failures.

The storage system 102 illustratively rebuilds stripe portions impacted by the one or more detected failures by reconstruction of impacted data blocks and parity blocks using non-impacted data blocks and parity blocks, using well-known techniques, such as the RAID 5 or RAID 6 techniques mentioned previously. This rebuild process continues until all of the stripe portions of the impacted stripes are fully rebuilt.

Numerous other types of RAID implementations can be used in illustrative embodiments herein, as will be appreciated by those skilled in the art, possibly using error correcting codes such as Reed Solomon codes or other types of codes that are known to those skilled in the art. The term "parity" as used herein is therefore intended to be broadly construed, so as to encompass these and other types of information suitable for use in recovering from at least one failure in at least one storage device.

Additional details regarding examples of techniques for storing data in RAID arrays such as the RAID arrangement 107 of the FIG. 1 embodiment are disclosed in U.S. Pat. No. 9,552,258, entitled "Method and System for Storing Data in RAID Memory Devices," and U.S. Pat. No. 9,891,994, entitled "Updated RAID 6 Implementation," each incorporated by reference herein. For example, these patents provide example techniques for computing parity blocks and performing rebuild processes using such parity blocks, although numerous other known techniques can be used.

In some embodiments, establishing a RAID arrangement in which sufficient rebuild capacity is guaranteed comprises executing an algorithm to determine an appropriate distribution of reserve capacity across multiple storage devices, and to utilize portions of that reserve capacity in a rebuild process triggered by a device failure.

An example of an algorithm that guarantees sufficient capacity for the RAID rebuild in the manner described above, without placing any assumptions on the assignment of blocks to stripes and using only a near minimal amount of reserved storage space, illustratively includes the following steps.

1. For each stripe, when the stripe is allocated determine which storage device will serve as its spare. This does not actually reserve any capacity. An identifier of the spare device is stored as part of stripe metadata for its corresponding stripe.

2. Maintain a table that indicates for each storage device how many times it serves as a spare for each other storage device.

3. For each storage device, the amount of reserve capacity is determined as the maximal amount of reserve capacity it provides for any other storage device.

4. When a storage device fails, each stripe allocates for use in a rebuild process at least one spare block from its spare device as identified in the stripe metadata.

Such an algorithm is illustratively executed by the stripe configuration logic 112, the parity computation logic 114 and the device rebuild logic 116 of the storage controller 108 in storage system 102.

These and other algorithms disclosed herein can provide guaranteed sufficient reserve capacity for rebuild, without regard to the particular RAID type being used (e.g., different RAID stripes may have been allocated for different RAID types) or whether multiple instances of one or more RAID types are used. Reserved capacity is shared at the device level, such that, for example, the reserved capacity of a first device can be used by a second device if that device fails, by a third device if that device fails, and so on. The disclosed algorithms are also computationally very simple, illustratively involving designation of spare devices for respective allocated stripes and reserving of spare blocks based on numbers of times each device serves as a spare for respective other devices, followed by selection of spare blocks from spare devices as part of a rebuild process when a device fails.

It is to be appreciated that this particular algorithm, like others described herein, is presented by way of illustrative example only, and can be varied in other embodiments. For example, certain steps can be performed at least in part in parallel with other steps in other embodiments. Also, additional or alternative steps can be used in other embodiments, as well as different RAID arrangements.

As indicated previously, the above-described techniques relating to guaranteeing sufficient capacity for RAID rebuild in the storage system 102 are illustratively implemented at least in part by the storage controller 108, utilizing its stripe configuration logic 112 and parity computation logic 114. A rebuild process utilizing data blocks and parity blocks to recover from one or more storage device failures is illustratively implemented at least in part by the storage controller 108, utilizing its device rebuild logic 116.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

A RAID group in some embodiments is established for a particular one of the storage nodes of a distributed implementation of storage system 102. The storage devices associated with the particular one of the storage nodes are illustratively part of a DAE of that storage node, although other storage device arrangements are possible. Each such storage device illustratively comprises an SSD, HDD or other type of storage drive. Similar arrangements can be implemented for each of one or more other ones of the storage nodes, although distributed implementations using multiple storage nodes are not required.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, RAID arrangement 107, storage controller 108, stripe configuration logic 112, parity computation logic 114, and device rebuild logic 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, which implements a process for guaranteeing sufficient capacity for RAID rebuild in the storage system 102. The process illustratively comprises an algorithm implemented at least in part by the storage controller 108 and one or more of its logic instances 112, 114 and 116. As noted above, the storage devices 106 in some embodiments are more particularly referred to as "drives" and may comprise, for example, SSDs, HDDs, hybrid drives or other types of drives. A plurality of storage devices, which may be of the same capacity or of various mixed capacities, over which a given RAID arrangement is implemented illustratively comprises what is generally referred to herein as a RAID group.

Figure 2:
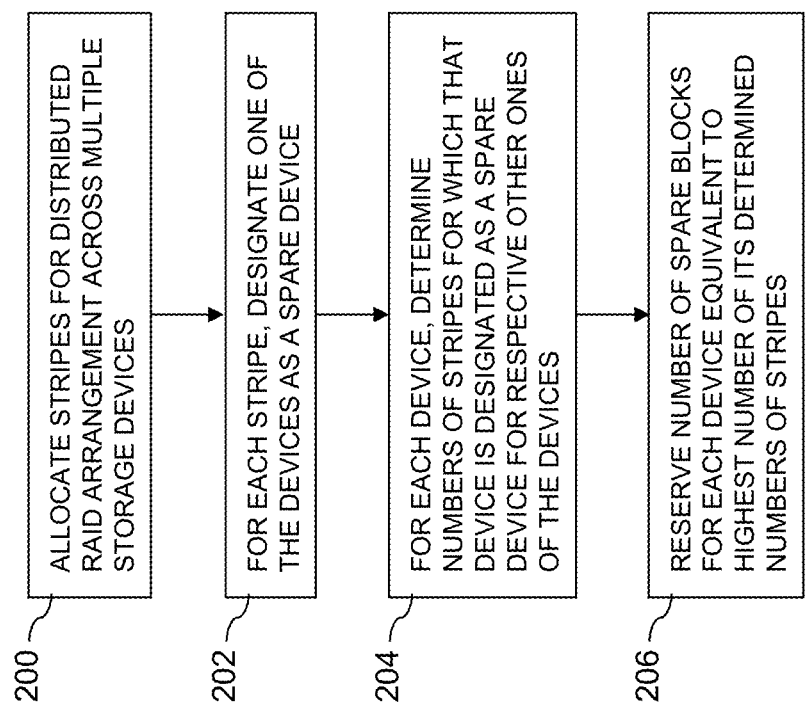
FIG. 2 is a flow diagram of a process for guaranteeing sufficient capacity for distributed RAID rebuild in an illustrative embodiment.

The process as illustrated in FIG. 2 includes steps 200 through 206, and is described in the context of storage system 102 but is more generally applicable to a wide variety of other types of storage systems each comprising multiple storage devices. The process is illustratively performed under the control of the storage controller 108, utilizing stripe configuration logic 112 and parity computation logic 114. Thus, the FIG. 2 process can be viewed as an example of an algorithm collectively performed by the logic instances 112 and 114. Other examples of such algorithms implemented by a storage controller or other storage system components will be described elsewhere herein.

In step 200, the storage system 102 allocates stripes for a distributed RAID arrangement comprising at least one RAID group such as that illustrated in the RAID arrangement 107 involving storage devices 106 of FIG. 1. The RAID arrangement 107 encompasses a particular number n of the storage devices 106. More detailed examples of distributed RAID arrangements involving n=5 storage devices, denoted D1, D2, D3, D4 and D5, are described below in conjunction with the illustrative embodiments of FIGS. 3 through 6.

In step 202, the storage system 102 designates, for each of the stripes of the RAID arrangement, a particular one of the storage devices as a spare device. Different ones of the storage devices are illustratively designated as spare devices for respective different ones of the stripes, and each of the storage devices is illustratively designated as a spare device for multiple distinct ones of the stripes.

In step 204, the storage system 102 determines, for each of the storage devices of the RAID arrangement, numbers of stripes for which that storage device is designated as a spare device for respective other ones of the storage devices.

In step 206, the storage system 102 reserves a number of spare blocks for each of the storage devices that is equivalent to the highest number of its determined number of stripes. The reserved numbers of spare blocks for the storage devices are such that sufficient rebuild capacity is guaranteed.

Stripe arrangements of the type utilized in the FIG. 2 process are illustratively configured using stripe configuration logic 112 of storage controller 108. In embodiments involving parity RAID arrangements, one or more parity blocks are computed for each RAID stripe using data blocks of that RAID stripe. Parity blocks are illustratively computed using parity computation logic 114 of storage controller 108.

The steps are shown in sequential order for clarity and simplicity of illustration only, and certain steps can at least partially overlap with other steps. For example, the determination of numbers of stripes for which each device is designated as a spare for respective other devices in step 204 and the reserving of numbers of spare blocks for respective devices in step 206 can be performed at least in part in parallel. For instance, steps 204 and 206 can be separately iterated for each device.

Different instances of the process of FIG. 2 can be performed for different portions of the storage system 102, such as different storage nodes of a distributed implementation of the storage system 102.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for guaranteeing sufficient capacity for RAID rebuild in a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for guaranteeing sufficient capacity for RAID rebuild for respective different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 in storage system 102 that is configured to perform the steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms.

Additional illustrative embodiments will now be described with reference to FIGS. 3 through 6. These embodiments utilize a distributed RAID arrangement involving n=5 storage devices, denoted D1, D2, D3, D4 and D5.

Referring initially to FIG. 3A, the RAID arrangement as shown includes 13 stripes of blocks which are distributed over the five storage devices in the manner illustrated. The RAID arrangement is more particularly assumed to comprise a RAID 5 arrangement in which each stripe includes two data blocks and one parity block. Thus, the total number of blocks per stripe is less than the number of storage devices over which the blocks are distributed, and the RAID arrangement is therefore a type of distributed RAID arrangement. Each stripe includes exactly three blocks on three different devices, as indicated with the "1" entries within the table illustrated in the figure.

The distribution of blocks over the storage devices in the example of FIG. 3A is generally random in appearance, and the total utilization of each device in number of blocks is substantially equal, with 8 blocks on each of D1, D2, D3 and D4 and 7 blocks on D5, as can be seen in the summation row labeled Σ.

Since the maximal number of utilized blocks per device is 8, when a device fails up to 8 blocks must be rebuilt to other devices. After the failure of a device there are 4 remaining devices, and therefore it may appear that it is sufficient to simply reserve two spare blocks on each device using a static algorithm. However, since each stripe may have its own restrictions of which devices can be considered for its spare (e.g., the spare may not be a device that is already in use by the stripe), solving this problem for the more general case is extremely difficult computationally. A simple static algorithm that uses any eligible device for a spare may not be able to fulfill the needs of all the stripes, leading to potential insufficient capacity to complete the rebuild. Such a scenario is illustrated in FIG. 3B.

In the FIG. 3B example, it is assumed that device D2 has failed, and that "x" entries in the table shown indicate the spare blocks that are selected for rebuilding the D2 blocks of respective ones of the stripes. Running from the top downward, the static algorithm gets stuck on stripe 11 where the two candidate devices for spare allocation to rebuild that stripe are D1 and D3. The problem is that both of the devices D1 and D3 have each already exhausted their respective reserved capacities of two blocks. The rebuild process in this example therefore fails to complete due to insufficient spare capacity.

Such insufficient capacity issues are addressed in illustrative embodiments using the techniques disclosed herein.

FIG. 4 shows an example allocation table in which a spare device is allocated to each of a plurality of RAID stripes in an illustrative embodiment. The RAID arrangement in this example is the same as that of FIGS. 3A and 3B, with the "1" entries indicating the blocks of each of the 13 stripes. The FIG. 4 example more particularly illustrates an allocation table in which, for each of the stripes, a particular one of the storage devices D1 through D5 is designated as a spare device for that stripe, by entry of its corresponding device identifier in the "spare" column of the allocation table.

Accordingly, each stripe is assigned a particular one of the devices as its spare device. For each stripe, as three of the devices are already used for blocks, there are only two candidate spare devices. The logic of stripe allocation is not restricted in this regard, and so in some embodiments the same or similar mechanism used to allocate blocks of the stripes to the storage devices can be used to allocate spare storage devices for the respective stripes. In some embodiments, in order to minimize the rebuild time, the spare allocation logic should attempt to maintain an even distribution of spare capacity, and an even number of device dependencies, although numerous other arrangements can be used in allocating the spare devices.

FIG. 5 shows an example reserve table in which numbers of spare blocks are reserved for respective ones of the storage devices D1 through D5, using the techniques disclosed herein, such that sufficient capacity is guaranteed for distributed RAID rebuild. The "blocks" column denotes for each of the storage devices in the "device" column the total number of stripes for which that device is designated as a spare device for respective other ones of the devices. A device cannot serve as a spare device for itself, and so there are zeros on the diagonal in the "source" portion of the table.

Considering device D1, that device is designated as a spare for a stripe block of device D2 twice, for D3 once, for D4 twice, and for D5 once, as is apparent from the allocation table of FIG. 4. The maximum of these determined numbers of stripes for device D1 is 2, as shown in the "blocks" column of the reserve table of FIG. 5.

Similarly, for device D2, that device is designated as a spare for a stripe block of device D1 three times, for D3 twice, for D4 once, and for D5 three times, as is again apparent from the allocation table of FIG. 4. The maximum of these determined numbers of stripes for device D2 is 3, as shown in the "blocks" column of the reserve table of FIG. 5.

As another example, for device D3, that device is designated as a spare for stripe blocks of device D1 twice, for D2 three times, for D4 twice, and for D5 twice, as is once again apparent from the allocation table of FIG. 4. The maximum of these determined numbers of stripes for device D3 is 3, as shown in the "blocks" column of the reserve table of FIG. 5.

The maximum number of blocks is similarly determined for devices D4 and D5, from the allocation table of FIG. 4.

Spare blocks are reserved for the different devices using the numbers in the "blocks" column of the reserve table. In other words, total numbers of spare blocks given by 2, 3, 3, 2 and 3 are reserved on the respective storage devices D1, D2, D3, D4 and D5. Although it may appear that the required spare blocks in this example (3 in some cases) are much higher (50% more) than what is theoretically required (only 2), that is primarily due to fact that the present example uses a very low number of stripes for clarity and simplicity of illustration. It is expected that numerous practical implementations will typically contain a much larger number of stripes, and therefore a much lower percentage increase in required spare capacity relative to the theoretical minimum associated with use of a static approach, while also serving to guarantee sufficient capacity to complete the rebuild process.

As noted above, use of a simple static algorithm led to insufficient capacity to complete the rebuild in FIG. 3B.

FIG. 6 illustrates that the reserved spare blocks following the "blocks" column of the FIG. 5 reserve table are guaranteed to provide sufficient capacity to complete the rebuild process after the failure of D2. More specifically, all eight blocks of the distributed RAID arrangement that were stored on failed device D2 are rebuilt using the selected spare blocks denoted by "x" entries in the table of FIG. 6, and unlike the FIG. 3B situation described previously, none of the surviving devices in FIG. 6 run out of spare capacity before the rebuilding of all impacted stripes is completed. More particularly, in the FIG. 6 example, D3 provides three spare blocks in the rebuild process, but three spare blocks were reserved for D3 in the FIG. 5 reserve table, and so the rebuild can complete successfully.

Although these examples use stripes and blocks as allocation units, this is by way of illustrative example only, and different allocation units can be used in other embodiments. For example, an allocation unit can be larger than a single RAID stripe, depending on various aspects of the RAID design. Illustrative embodiments can be adapted in a straightforward manner for use with these and other such larger allocation units.

Also, the examples above are given for RAID 5 but illustrative embodiments are not restricted to RAID 5, RAID 6 or other types of parity RAID. Any RAID arrangement or combination of RAID arrangements may be used.

Accordingly, it is to be appreciated that the particular RAID arrangements illustrated in FIGS. 3 through 6 are examples only, and should not be viewed as limiting in any way. A wide variety of other RAID arrangements may be configured to guarantee sufficient capacity for RAID rebuild using the techniques disclosed herein.

The above-described operations associated with guaranteeing sufficient capacity for RAID rebuild are presented by way of illustrative example only, and should not be viewed as limiting in any way. Additional or alternative operations can be used in other embodiments.

Again, references to "disks" in the context of RAID herein are intended to be broadly construed, and should not be viewed as being limited to disk-based storage devices. For example, the disks may comprise SSDs, although it is to be appreciated that many other storage device types can be used.

Illustrative embodiments of a storage system with functionality for guaranteeing sufficient capacity for RAID rebuild in a storage system as disclosed herein can provide a number of significant advantages relative to conventional arrangements.

For example, some embodiments disclosed herein provide RAID arrangements in which spare blocks are reserved for storage devices in a manner that ensures that a rebuild process initiated responsive to a failure of one or more of the storage devices is guaranteed to have sufficient available storage device capacity to complete the rebuilding of the blocks of the one or more failed storage devices.

Advantageously, such techniques in illustrative embodiments herein can guarantee sufficient capacity to complete the rebuild process, while also being computationally simple, as well as highly efficient in that only at or near minimum amounts of capacity need to be reserved for rebuild within the storage system.

Moreover, the disclosed techniques in illustrative embodiments overcome additional drawbacks of conventional approaches. For example, some embodiments can be used for any type of RAID arrangement, including those involving combinations of multiple instances of distinct RAID approaches, such as a mixture of multiple distinct RAID types over the same set of storage devices, or a mixture of multiple stripe sets of different instances of one RAID type over the same set of storage devices.

Illustrative embodiments disclosed herein provide efficient mechanisms to guarantee sufficient capacity in these and other situations in which allocation of blocks to stripes cannot be predetermined, and in numerous other demanding RAID arrangements, including those involving parity RAID techniques and/or non-parity RAID techniques.

Accordingly, illustrative embodiments provide advantages over conventional techniques that utilize static allocation policies or "best efforts" policies. These and other conventional techniques cannot guarantee sufficient capacity for a wide range of different RAID arrangements or combinations of such arrangements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for guaranteeing sufficient capacity for RAID rebuild in a storage system will now be described in greater detail with reference to FIGS. 7 and 8. Although described in the context of system 100, these platforms may also be used to implement at least portions of other information processing systems in other embodiments.

Figure 7:
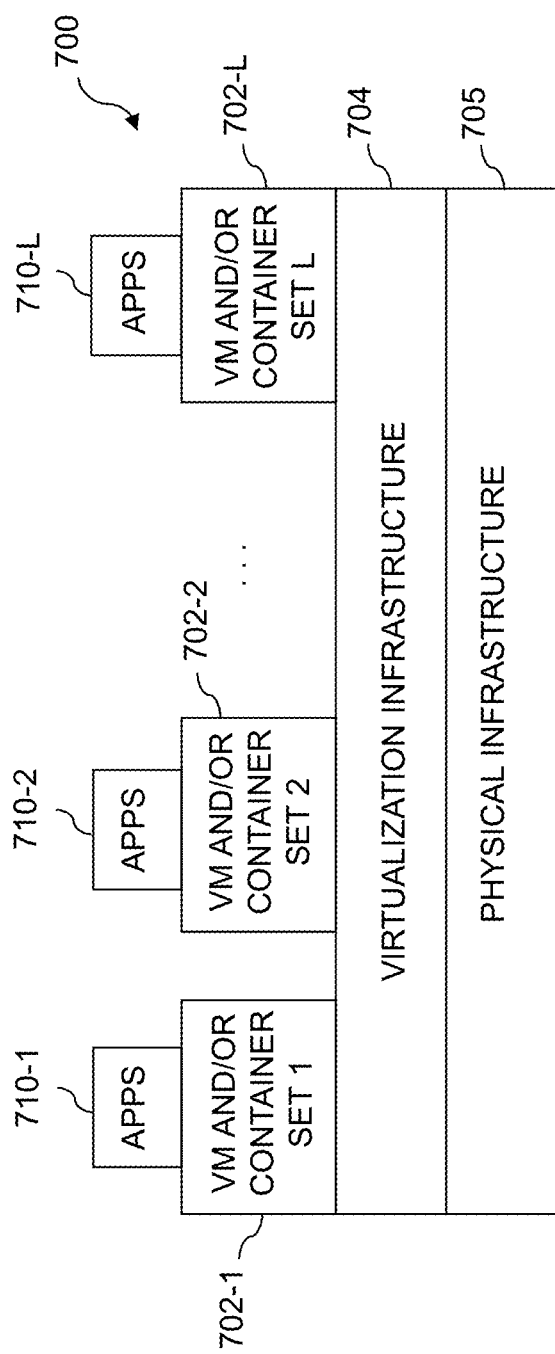
FIGS. 7 and 8 show examples of processing platforms that may be utilized to implement at least a portion of an information processing system in illustrative embodiments.
Figure 8:
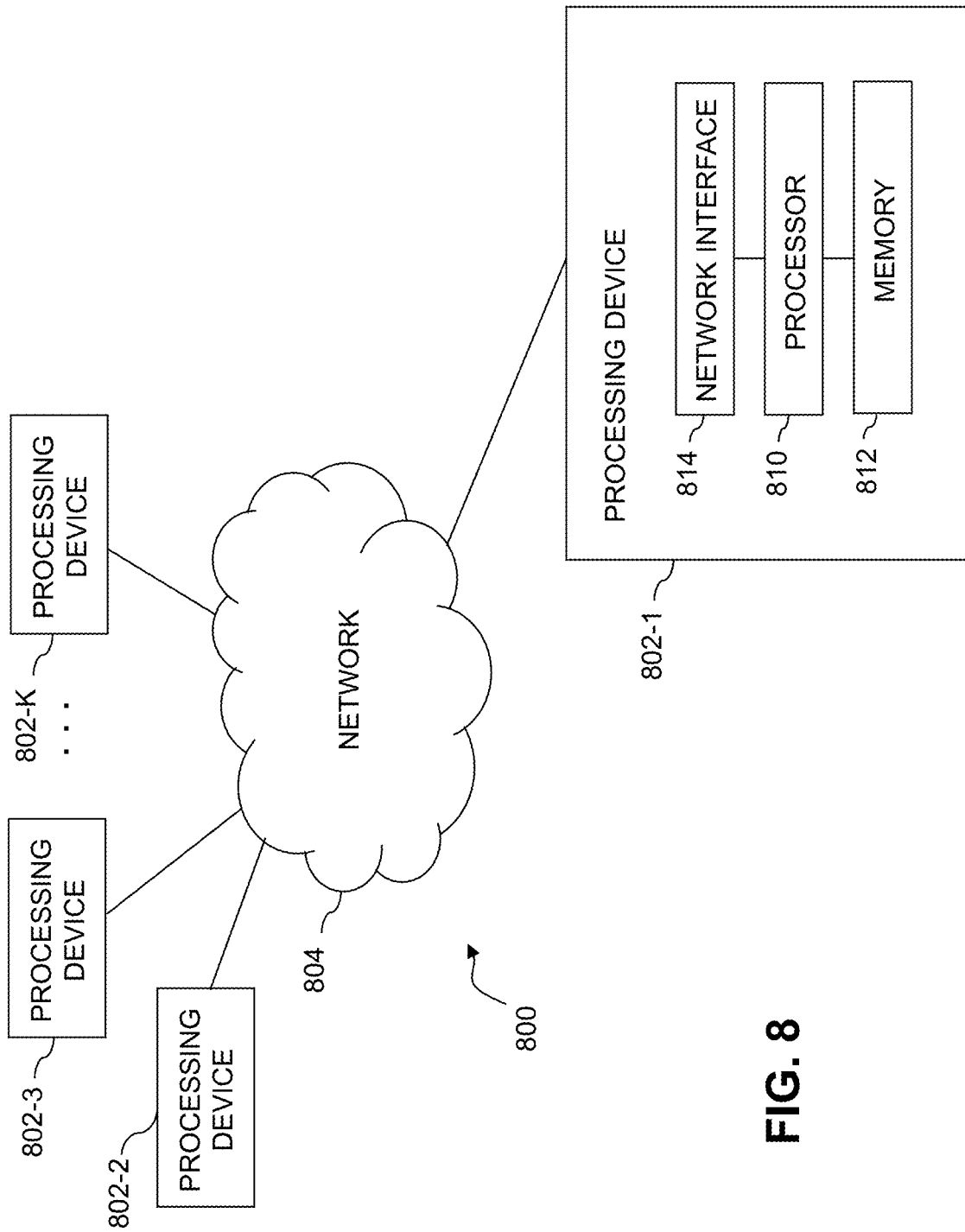

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide at least portions of the functionality described herein using one or more processes running on a given one of the VMs. For example, each of the VMs can implement logic instances and/or other components supporting the disclosed functionality for guaranteeing sufficient capacity for RAID rebuild in the storage system 102.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide at least portions of the functionality described herein. For example, a container host device supporting multiple containers of one or more container sets can implement logic instances and/or other components supporting the disclosed functionality for guaranteeing sufficient capacity for RAID rebuild in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for guaranteeing sufficient capacity for RAID rebuild in a storage system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, RAID arrangements, storage controllers, stripe configuration logic, parity computation logic, device rebuild logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage system being configured:
to establish a redundant array of independent disks (RAID) arrangement comprising a plurality of stripes, with each of the plurality of stripes comprising a plurality of blocks, the blocks being distributed across multiple ones of the storage devices; and
in conjunction with establishment of the RAID arrangement:
for each of the plurality of stripes, to designate a particular one of the storage devices as a spare storage device for that stripe;
for each of the storage devices, to determine numbers of the stripes for which that storage device is designated as a spare device for respective ones of the other storage devices; and
to reserve a particular number of spare blocks for each of the storage devices based at least in part on the determined numbers of the stripes for which that storage device is designated as a spare device for respective ones of the other storage devices.

2. The apparatus of claim 1 wherein the RAID arrangement comprises a distributed RAID arrangement in which a total number of blocks per stripe is less than a total number of the storage devices over which the blocks of the plurality of stripes are distributed.

3. The apparatus of claim 1 wherein the RAID arrangement comprises at least one parity RAID arrangement supporting recovery from a failure of at least one of the plurality of storage devices and wherein a given one of the stripes comprises a plurality of data blocks and one or more parity blocks.

4. The apparatus of claim 1 wherein the storage system is further configured to store stripe metadata indicating for each of the stripes the particular one of the storage devices that is designated as a spare storage device for that stripe.

5. The apparatus of claim 4 wherein the stripe metadata indicating for each of the stripes the particular one of the storage devices that is designated as a spare storage device for that stripe comprises an allocation table, the allocation table comprising a plurality of entries for respective ones of the stripes with each such entry comprising an identifier of the storage device that is designated as a spare storage device for that stripe.

6. The apparatus of claim 1 wherein the storage system is further configured to store stripe metadata indicating for each of the storage devices the determined numbers of the stripes for which that storage device is designated as a spare device for respective ones of the other storage devices.

7. The apparatus of claim 6 wherein the stripe metadata indicating for each of the storage devices the determined numbers of the stripes for which that storage device is designated as a spare device for respective ones of the other storage devices comprises a reserve table, the reserve table comprising a plurality of entries for respective ones of the storage devices with each such entry comprising the determined numbers of the stripes for which that storage device is designated as a spare device for respective ones of the other storage devices.

8. The apparatus of claim 1 wherein reserving a particular number of spare blocks for each of the storage devices based at least in part on the determined numbers of the stripes for which that storage device is designated as a spare device for respective ones of the other storage devices comprises reserving a particular number of spare blocks that is equivalent to a highest one of the determined numbers of the stripes.

9. The apparatus of claim 1 wherein the storage system is further configured:
to detect a failure of at least one of the storage devices; and
responsive to the detected failure, to initiate a rebuild process to reconstruct blocks of the one or more failed storage devices utilizing the blocks of other ones of the storage devices.

10. The apparatus of claim 9 wherein the rebuild process utilizes at least a subset of the reserved spare blocks of respective ones of the non-failed storage devices.

11. The apparatus of claim 1 wherein the reserved spare blocks are sufficient in number to guarantee that a rebuild process initiated responsive to a failure of one or more of the storage devices has sufficient available storage device capacity to reconstruct the blocks of the one or more failed storage devices.

12. The apparatus of claim 1 wherein the reserved spare blocks of a given one of the storage devices are available for utilization in reconstructing one of at least first and second other ones of the storage devices in a rebuild process initiated responsive to a failure of said one of the at least first and second other ones of the storage devices.

13. The apparatus of claim 1 wherein each of the storage devices is designated as a spare device for multiple other ones of the storage devices.

14. A method for use in a storage system comprising a plurality of storage devices, the method comprising:
to establish a redundant array of independent disks (RAID) arrangement comprising a plurality of stripes, with each of the plurality of stripes comprising a plurality of blocks, the blocks being distributed across multiple ones of the storage devices; and
in conjunction with establishment of the RAID arrangement:
for each of the plurality of stripes, to designate a particular one of the storage devices as a spare storage device for that stripe;

for each of the storage devices, to determine numbers of the stripes for which that storage device is designated as a spare device for respective ones of the other storage devices; and to reserve a particular number of spare blocks for each of the storage devices based at least in part on the determined numbers of the stripes for which that storage device is designated as a spare device for respective ones of the other storage devices.

15. The method of claim 14 wherein reserving a particular number of spare blocks for each of the storage devices based at least in part on the determined numbers of the stripes for which that storage device is designated as a spare device for respective ones of the other storage devices comprises reserving a particular number of spare blocks that is equivalent to a highest one of the determined numbers of the stripes.

16. The method of claim 14 wherein the reserved spare blocks are sufficient in number to guarantee that a rebuild process initiated responsive to a failure of one or more of the storage devices has sufficient available storage device capacity to reconstruct the blocks of the one or more failed storage devices.

17. The method of claim 14 wherein each of the storage devices is designated as a spare device for multiple other ones of the storage devices.

18. A computer program product comprising a non-transitory processor-readable storage medium having stored therein program code of one or more software programs, wherein the program code when executed by a processor of a storage system comprising a plurality of storage devices, causes the storage system:

to establish a redundant array of independent disks (RAID) arrangement comprising a plurality of stripes, with each of the plurality of stripes comprising a plurality of blocks, the blocks being distributed across multiple ones of the storage devices; and in conjunction with establishment of the RAID arrangement:

for each of the plurality of stripes, to designate a particular one of the storage devices as a spare storage device for that stripe;

for each of the storage devices, to determine numbers of the stripes for which that storage device is designated as a spare device for respective ones of the other storage devices; and to reserve a particular number of spare blocks for each of the storage devices based at least in part on the determined numbers of the stripes for which that storage device is designated as a spare device for respective ones of the other storage devices.

19. The computer program product of claim 18 wherein reserving a particular number of spare blocks for each of the storage devices based at least in part on the determined numbers of the stripes for which that storage device is designated as a spare device for respective ones of the other storage devices comprises reserving a particular number of spare blocks that is equivalent to a highest one of the determined numbers of the stripes.

20. The computer program product of claim 18 wherein the reserved spare blocks are sufficient in number to guarantee that a rebuild process initiated responsive to a failure of one or more of the storage devices has sufficient available storage device capacity to reconstruct the blocks of the one or more failed storage devices.

* * * * *